(12) United States Patent
Patri et al.

(10) Patent No.: US 10,753,825 B2
(45) Date of Patent: Aug. 25, 2020

(54) CAVITATION ANTI-RESONANCE AND ANTI-SOOT END PIECE FOR PRESSURE SENSOR OF AN INTERNAL COMBUSTION ENGINE

(71) Applicants: Continental Automotive France, Toulouse (FR); Continental Automotive GmbH, Hannover (DE)

(72) Inventors: Cyrille Patri, Villenueve Tolosane (FR); Matthieu Joly, Rabastens (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 176 days.

(21) Appl. No.: 15/772,598

(22) PCT Filed: Nov. 3, 2016

(86) PCT No.: PCT/EP2016/001825
§ 371 (c)(1),
(2) Date: May 1, 2018

(87) PCT Pub. No.: WO2017/076501
PCT Pub. Date: May 11, 2017

(65) Prior Publication Data
US 2019/0128778 A1    May 2, 2019

(30) Foreign Application Priority Data

Nov. 5, 2015  (FR) ..................................... 15 60599

(51) Int. Cl.
*G01M 15/08*  (2006.01)
*G01L 19/06*  (2006.01)
*F02F 1/24*  (2006.01)

(52) U.S. Cl.
CPC ............... *G01M 15/08* (2013.01); *F02F 1/24* (2013.01); *G01L 19/0609* (2013.01); *G01L 19/0627* (2013.01)

(58) Field of Classification Search
CPC ............... G01M 15/08; G01L 19/0609; G01L 19/0627; F02F 1/24
See application file for complete search history.

(56) References Cited

U.S. PATENT DOCUMENTS 6,849,829 B1 * 2/2005 Otterbach ............... F23Q 7/001
                                                  123/145 A
8,356,511 B2 * 1/2013 Ramond ................. G01L 23/10
                                                  73/114.16

(Continued)

FOREIGN PATENT DOCUMENTS

CN         1609575 A    4/2005
CN       101400887 A    4/2009

(Continued)

OTHER PUBLICATIONS

International Search Report and Written Opinion for International Application No. PCT/EP2016/001825, dated Feb. 3, 2017, 9 pages.

(Continued)

*Primary Examiner* — Freddie Kirkland, III
(74) *Attorney, Agent, or Firm* — RatnerPrestia

(57) ABSTRACT

A pressure sensor for an internal combustion engine, which includes: a body containing a pressure-measuring membrane and a device for attaching to the cylinder head of the engine; and an end piece which extends substantially in an axial extension of the body, and includes a long part, and a substantially hemispherical convexity positioned on the end part of the long part.

13 Claims, 1 Drawing Sheet

(56) References Cited

U.S. PATENT DOCUMENTS

| | | | |
|---|---|---|---|
| 8,429,956 B2* | 4/2013 | Borgers | G01L 23/18 73/114.18 |
| 8,950,247 B2* | 2/2015 | Borgers | G01M 15/08 73/114.19 |
| 9,068,549 B2* | 6/2015 | Suzuki | F23Q 7/00 |
| 9,733,616 B2* | 8/2017 | Ruchet | G02B 6/385 |
| 9,909,947 B2* | 3/2018 | Reuter | F02M 65/003 |
| 9,964,306 B2* | 5/2018 | Hain | F23Q 7/001 |
| 10,168,242 B2* | 1/2019 | Brechbuhl | G01L 23/10 |
| 10,378,988 B2* | 8/2019 | Buck | G01L 19/142 |
| 2009/0084348 A1 | 4/2009 | Batenburg et al. | |
| 2011/0214494 A1 | 9/2011 | Ramond et al. | |
| 2011/0215080 A1* | 9/2011 | Hain | F23Q 7/001 219/270 |
| 2011/0240628 A1* | 10/2011 | Goretti | F23Q 7/001 219/270 |
| 2013/0263671 A1 | 10/2013 | Wagner | |
| 2014/0130585 A1 | 5/2014 | Borgers et al. | |
| 2014/0130586 A1* | 5/2014 | Zwollo | G01L 23/18 73/114.21 |
| 2014/0373799 A1 | 12/2014 | Suzuki et al. | |

FOREIGN PATENT DOCUMENTS

| | | |
|---|---|---|
| CN | 103808451 A | 5/2014 |
| CN | 203657966 U | 6/2014 |
| EP | 2730904 A1 | 5/2014 |
| FR | 1142070 A | 9/1957 |
| WO | 2010026316 A1 | 3/2010 |

OTHER PUBLICATIONS

Chinese Office Action for Chinese Application No. 201680064563.4, dated Aug. 29, 2019 with translation. 12 pages.

* cited by examiner

CAVITATION ANTI-RESONANCE AND ANTI-SOOT END PIECE FOR PRESSURE SENSOR OF AN INTERNAL COMBUSTION ENGINE

CROSS REFERENCE TO RELATED APPLICATIONS

This application is the U.S. National Phase Application of PCT International Application No. PCT/EP2016/001825, filed Nov. 3, 2016, which claims priority to French Patent Application No. 1560599, filed Nov. 5, 2015, the contents of such applications being incorporated by reference herein.

FIELD OF THE INVENTION

The invention relates to the field of pressure sensors integrated into the combustion chamber of the engine block of an internal combustion engine. The invention relates more particularly to such a sensor provided with an end piece intended to equip the engine block of a motor vehicle.

BACKGROUND OF THE INVENTION

Combustion engines of motor vehicles comprise at least one combustion chamber formed between a cylinder, a piston sliding in the cylinder and a cylinder head facing the piston. Such a cylinder head bears at least one valve and at least one spark plug for petrol engines or a glow plug for diesel engines. Such a cylinder head of the engine can also be provided with a pressure sensor to know the value of the pressure inside each cylinder with the aim of better controlling the progression of the combustion within the engine. This information is used to regulate injection of fuel into each of the cylinders with more precision. The fuel consumption of the engine can thus be optimized and polluting emissions reduced.

Application WO2010/26316, which is incorporated by reference describes this type of pressure sensor integrated into the cylinder head within the context of diesel engines, petrol engines or the like, it being possible for said sensor to be completely or partly integrated into the glow plug, the injector or the like.

It is also known practice to drill a housing into the cylinder head in order to insert the pressure sensor therein and give it access to the combustion chamber. Thus, the pressure sensor communicates with the combustion chamber through a small tubular cavity. Such a tubular cavity promotes the formation of oscillatory harmonic acoustic waves. Such waves are due to the propagation of the pressure waves in the tube and disturb the reading of the actual pressure by the sensor. Specifically, the wave propagates in the tube and is reflected by striking the measuring element of the sensor, which results in cavitation phenomena. These acoustic waves, through their impacts on the aforesaid measuring element, are then superimposed onto the actual pressure of the combustion, which creates a noise on the measurement.

In addition, the chemical reaction of the combustion of an engine produces various residues which are generally referred to as "soot". This soot is propagated by the turbulence of the combustion and can be deposited on all the metallic surfaces of the chamber, leading to coking of the engine. Therefore, the soot is also deposited on the measuring sensor and, in particular, on the part of the sensor positioned facing the combustion chamber. This deposit promotes the creation of a crust which changes or disturbs the measuring properties of the sensor. In particular, such a crust, because it is rigid, alters the measuring sensitivity of the sensor since its sensitive element will then be less exposed to the effect of the pressure retained by the crust.

Moreover, the presence of a black crust on the measuring sensor changes the effect of the temperature of the combustion on the end piece of the sensor, which leads to thermal disturbances on the sensor and causes deformations, stress, strains, etc. The sensor therefore becomes more sensitive to thermal shocks and to pressure variations during the combustion cycles, which over time has an impact on the reading precision and the service life of the sensor.

SUMMARY OF THE INVENTION

There is therefore a need to avoid soot deposits and/or the propagation of parasitic acoustic waves at the pressure-measuring sensor.

An aspect of the invention is aimed at solving the disadvantages of the prior art and accordingly relates to a pressure sensor for an internal combustion engine comprising:
  a body containing a pressure-measuring means comprising a membrane and a means for fastening to the cylinder head of the aforesaid engine; and
  an end piece which extends substantially in an axial continuation of said body, characterized in that the end piece comprises an elongate part, and a substantially hemispherical convexity positioned on the terminal part of said elongate part.

The elongate part and the terminal part which extends it are connected to the base of the end piece such that they avoid, at least partially, a direct communication between the port of the tubular cavity of the engine cylinder and the pressure-measuring means. Thus, the deposits and the parasitic waves are greatly reduced.

Said elongate part of said end piece of the pressure sensor according to an aspect of the invention advantageously comprises a portion of frustoconical shape.

Such a frustoconical shape of the end of the sensor which is intended to penetrate into the combustion chamber forms breaks in slope on the elongate part of the end piece. Such breaks in slope on the end piece result in a break in the geometry of the residual space between the tubular cavity of the cylinder head and the end piece, which is then of irregular shape. The inventors have demonstrated that this makes it possible to avoid the cavitation phenomena and ultimately guarantees a reliable reading of the pressure within the combustion chamber.

All of the elongate part is advantageously of frustoconical shape and flares toward the convexity of the end piece. Thus, the end piece has a configuration which is that of a teat of which the nipple, which can also be referred to in this context as a projection, has a wider cross section than the base. Such a configuration of the projection of the end piece makes it possible to create a Venturi effect which will accelerate the flow of the pressure waves, or even make them nonlaminar. In addition, this configuration serves as a barrier and allows the formation of a gas pocket in the tubular cavity formed in the cylinder head and traversed by the end piece that thermally isolates the body of the sensor. Consequently, the sensor is not subjected to the thermal gradients due to combustion since this gas pocket smoothes and levels out the thermal variations. Moreover, such a gas pocket is substantially isolated from the rest of the combustion chamber, and therefore the dead volume occupied by the aforesaid tubular cavity does not disturb the operation of the engine and does not impact on its performance.

Advantageously, the elongate part of the end piece of the pressure sensor has a cross section of 1 to 3 mm in diameter at its base, a cross section of 2 to 6 mm in diameter on its terminal end and an axial length of 5 to 9 mm. The elongate part of the end piece of the pressure sensor advantageously has a cross section of 20 to 50% less in diameter at its base with respect to the diameter of the element of the sensor which receives the pressure, a cross section of minimum 1 mm less diameter on its terminal end than the diameter of the tubular cavity of the cylinder head and a minimum axial length such that the frequency of the oscillatory harmonic acoustic waves generated in the remaining length of the tubular cavity of the cylinder head is outside the passband of the sensor and at most equal to 100% of the length of the tubular cavity of the cylinder head, the whole combined to obtain a total angle of the frustoconical part of between 14° and 60° (Venturi effect, nonlaminar flow).

Advantageously, the elongate part of the end piece is mounted on the body of the sensor by at least one flexible fastening means. The elongate part of the end piece thus fastened to the body by flexible connections has a freedom of movement and can therefore vibrate on the body during the explosion cycles of the engine. These vibrations eliminate soot or prevent it from being deposited, and therefore the pressure sensor is no longer coked. Preferably, the various parts of the sensor are produced by using casting molds or by mechanical machining. Advantageously, the body and the end piece are joined by welding.

At least one part of the end piece is advantageously composed of an elastically deformable material. The end piece can thus vibrate on the body of the pressure sensor to avoid coking. The end piece is advantageously composed of a stainless steel, preferably a stainless steel whose Young's modulus is between 150 and 250 GPa, with a yield point Rp0.2 above 500 MPa.

The pressure-measuring means of the body of the pressure sensor advantageously comprises a membrane adapted to deform under the effect of the pressure.

The means for fastening the body of the pressure sensor to the cylinder head of the engine advantageously comprises a thread.

An aspect of the present invention also relates to an end piece for a pressure sensor according to the invention, comprising an elongate part comprising a portion of frustoconical shape, and a substantially hemispherical convexity positioned on the terminal part of said elongate part. Advantageously, all of the elongate part of said end piece is of frustoconical shape and flares toward the convexity of the end piece. Advantageously, the elongate part has a cross section of 1 to 3 mm in diameter at its base, a cross section of 2 to 6 mm in diameter on its terminal end and an axial length of 5 to 9 mm.

An aspect of the present invention also relates to an internal combustion engine cylinder head comprising, on the one hand, a bore comprising a thread and a tubular cavity and, on the other hand, a pressure sensor according to the invention fastened by the thread of the aforesaid bore such that the end piece is erected in the tubular cavity.

An aspect of the present invention also relates to a motor vehicle internal combustion engine comprising a cylinder head according to the invention, in which said tubular cavity of the bore of the cylinder head opens into the port of the combustion chamber of said engine.

BRIEF DESCRIPTION OF THE DRAWINGS

Other features and advantages of aspects of the invention will become apparent in the light of the following detailed description given on the basis of the appended drawings. These examples are given in a nonlimiting manner. The detailed description is to be read in relation with the appended drawings, in which FIGS. 1 and 2 partially represent sectional views of a pressure sensor according to the prior art.

DETAILED DESCRIPTION OF THE PREFERRED EMBODIMENTS

Figure 1:
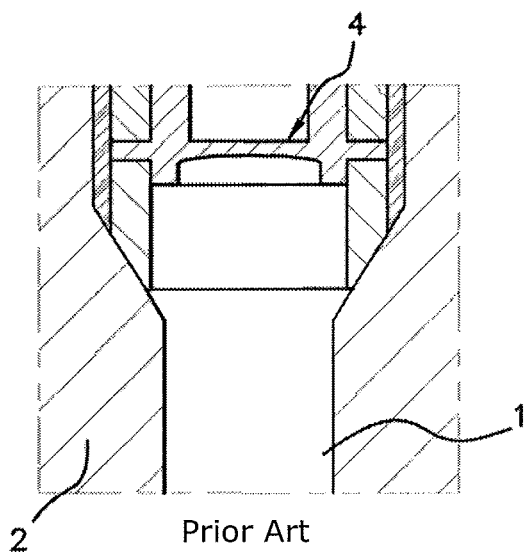
Figure 2:
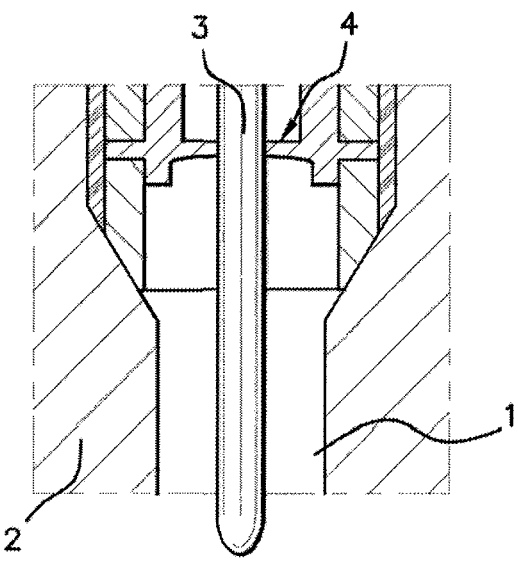

The pressure sensors for an internal combustion engine that are known from the prior art are connected to the combustion chamber by a tube-shaped cavity such as the tubular cavity 1 represented in FIG. 1, formed in a cylinder head 2 of a combustion engine. These pressure sensors of the prior art optionally comprise a finger 3 of cylindrical shape, as represented in FIG. 2, which plunges into such a tubular cavity 1. The pressure-measuring means 4 of these pressure sensors is placed facing the combustion through this tubular cavity 1. This tubular cavity 1 generates, promotes the formation and maintain oscillatory harmonic acoustic waves, which are sinusoidal waves whose natural frequency is related to the dimension of the tube. These waves are propagated in the tube and are reflected on the walls of the tubular cavity by striking on the measuring element of the sensor, which constitutes the cavitation phenomenon. These pressure sensors therefore measure these parasitic acoustic waves which are superimposed on the pressure waves formed by the combustion of the gases. The reading of the pressure waves is therefore not reliable.

Figure 3:
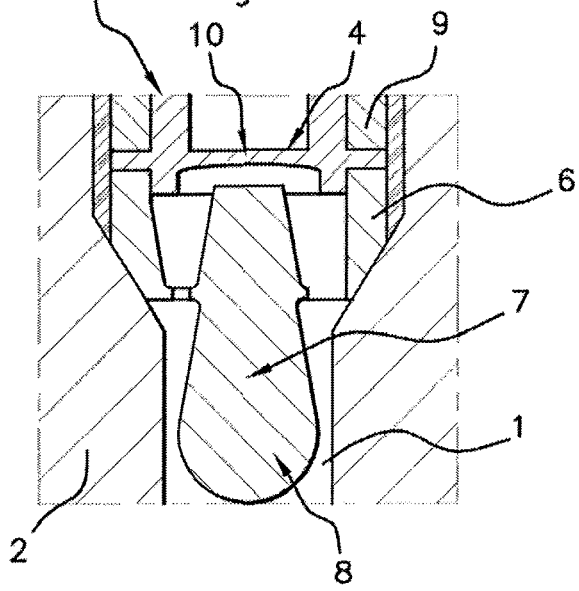
FIG. 3 partially represents a sectional view of a pressure sensor according to an aspect of the invention.

FIG. 3 shows a pressure sensor 5 according to an aspect of the invention mounted in the cylinder head 2 of an internal combustion engine, this pressure sensor 5 comprising an end piece 6 which extends in the port of the tubular cavity 1 of the cylinder head of the engine.

According to the embodiment represented in FIG. 3, the end piece 6 of the pressure sensor 5 is composed of an elongate part 7 which flares from its base to its terminal end and which is extended by a convexity 8 of the end piece. In this context, this part of the end piece 6 forms a projection, which is made up of the flared elongate part 7 and of the substantially hemispherical convexity 8, the structure of which is similar to that of the nipple of a teat. By virtue of this geometry of the end piece, the cavitation phenomena are avoided and a Venturi effect is advantageously created. A reliable reading of the pressure waves generated during the explosion cycles can therefore be carried out by the pressure sensor 5. The sensor 5 bears on the cylinder head 2 by a cone-on-cone contact, the angle of the end piece 6 being more open by 3° on average with respect to the angle of the cylinder head in order to guarantee sealing.

In a particularly preferred variant, the elongate part 7 of the end piece 6 has a cross section of 2 mm in diameter at its base, a cross section of 4 mm in diameter on its terminal end and an axial length of 7 mm.

In addition, such a configuration of the end piece 6 serves as a barrier and allows the formation of a gas pocket in the tubular cavity 1 which thermally isolates the base of the elongate part 7 of the end piece 6 of the pressure sensor 5. Consequently, the pressure sensor 5 is not subjected to the thermal gradients due to combustion since this gas pocket smoothes and levels out the thermal variations. The thermal inertia of the elongate part 7 of the end piece 6 also participates in reducing the effects due to the temperature variations. Moreover, such a gas pocket is substantially isolated from the rest of the combustion chamber, and therefore the dead volume occupied by the tubular cavity 1 does not disturb the operation of the engine and does not impact on its performance.

The pressure sensor 5 comprises a body 9 of which a part is visible in FIG. 3, which body 9 comprises a thread formed on its outer shell for screwing onto the cylinder head. The pressure-measuring means 4 of the sensor 5 is situated on the body 9 and comprises a membrane 10 adapted to deform under the effect of the pressure and to allow the pressure to be measured. By virtue of the configuration of the end piece 6, as described above, the membrane 10 is protected from temperature variations.

The end piece 6 of the sensor is mounted on the body 9 of the sensor with the aid of a flexible fastening means. This flexible fastening means imparts a freedom of movement to the end piece 6 of the sensor which can start to shake in response to the vibrations generated by the engine during explosion cycles. Such shaking avoids the deposit of soot and makes it possible to eliminate the residual deposits already formed on the sensor 5. The reading of the pressure sensor 5 is therefore advantageously reliable, since the accumulation of soot which affects the reading of the pressure is avoided.

The invention claimed is:

1. A pressure sensor for an internal combustion engine comprising:
   a body containing a pressure-measuring means, comprising a membrane and a means for fastening to the cylinder head of the aforesaid engine; and
   an end piece which extends substantially in an axial continuation of said body, said end piece comprising an elongate part, and a substantially hemispherical convexity positioned on a terminal part of said elongate part,
   wherein all of the elongate part of said end piece is of frustoconical shape and flares outwardly toward the convexity of the end piece.

2. The pressure sensor as claimed in claim 1, wherein the elongate part has a cross section of 1 to 3 mm in diameter at its base, a cross section of 2 to 6 mm in diameter on its terminal end and an axial length of 5 to 9 mm.

3. The pressure sensor as claimed in claim 2, wherein the elongate part of the end piece is mounted on the body of the sensor by at least one flexible fastening means.

4. The pressure sensor as claimed in claim 2, wherein the body and the end piece are joined by welding.

5. The pressure sensor as claimed in claim 1, wherein the elongate part of the end piece is mounted on the body of the sensor by at least one flexible fastening means.

6. The pressure sensor as claimed in claim 5, wherein the body and the end piece are joined by welding.

7. The pressure sensor as claimed in claim 1, wherein the body and the end piece are joined by welding.

8. The pressure sensor as claimed in claim 1, wherein at least one part of the end piece is composed of an elastically deformable material.

9. An internal combustion engine cylinder head comprising, on the one hand, a bore comprising a thread and a tubular cavity and, on the other hand, a pressure sensor as claimed in claim 1 fastened by a thread of the aforesaid bore such that the end piece is erected in the tubular cavity.

10. A motor vehicle internal combustion engine comprising a cylinder head as claimed in claim 9, in which said tubular cavity of the bore of the cylinder head opens into a port of the combustion chamber of said engine.

11. An end piece for a pressure sensor comprising an elongate part comprising a portion of frustoconical shape flaring outwardly toward a terminal part of the elongate part, and a substantially hemispherical convexity forming a closed terminal end of the terminal part of said elongate part.

12. The end piece for a pressure sensor as claimed in claim 11, wherein the elongate part has a base end opposite the closed terminal end, and wherein all of the elongate part of said end piece between the base end and the convexity is of frustoconical shape and flares toward the convexity of the end piece.

13. The end piece for a pressure sensor as claimed in claim 12, wherein the elongate part has a cross section of 1 to 3 mm in diameter at its base, a cross section of 2 to 6 mm in diameter on its terminal end and an axial length of 5 to 9 mm.

* * * * *